United States Patent
Hu et al.

(10) Patent No.: US 10,528,185 B2
(45) Date of Patent: Jan. 7, 2020

(54) FLOATING TOUCH METHOD AND TOUCH DEVICE

(71) Applicant: Touchplus Information Corp., New Taipei (TW)

(72) Inventors: Shih-Hsien Hu, New Taipei (TW); Yaosheng Chou, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 204 days.

(21) Appl. No.: 15/243,004

(22) Filed: Aug. 22, 2016

(65) Prior Publication Data

US 2016/0357328 A1 Dec. 8, 2016

Related U.S. Application Data (63) Continuation-in-part of application No. 14/492,645, filed on Sep. 22, 2014, now abandoned.

(60) Provisional application No. 61/881,049, filed on Sep. 23, 2013.

(51) Int. Cl.
*G06F 3/041* (2006.01)
*G06F 3/044* (2006.01)
*G06F 3/0488* (2013.01)

(52) U.S. Cl.
CPC ........ *G06F 3/041661* (2019.05); *G06F 3/044* (2013.01); *G06F 3/0416* (2013.01); *G06F 3/04886* (2013.01); *G06F 2203/04101* (2013.01); *G06F 2203/04809* (2013.01)

(58) Field of Classification Search
CPC ........ G06F 3/044; G06F 3/0416; G06F 3/041; G06F 3/04166; G06F 3/041661
See application file for complete search history.

(56) References Cited

U.S. PATENT DOCUMENTS

| | | | | |
|---|---|---|---|---|
| 7,663,607 B2 * | 2/2010 | Hotelling | ............. | G06F 3/0416 345/173 |
| 8,054,300 B2 * | 11/2011 | Bernstein | ............. | G06F 3/0416 178/18.06 |
| 8,115,499 B2 * | 2/2012 | Osoinach | ........... | H03K 17/9622 324/662 |
| 8,144,125 B2 * | 3/2012 | Peng | ....................... | G06F 3/044 178/18.01 |
| 8,217,914 B2 * | 7/2012 | Koshiyama | ........... | G06F 3/0412 345/173 |
| 8,284,165 B2 * | 10/2012 | Koshiyama | ........... | G06F 3/0412 345/173 |

(Continued)

*Primary Examiner* — Michael J Jansen, II
(74) *Attorney, Agent, or Firm* — WPAT, PC (57) ABSTRACT

A floating touch method and a touch device are provided. The touch device includes a capacitive touch panel and a sensor circuit. The capacitive touch panel includes separate electrode units and connecting traces corresponding to the separate electrode units one-on-one. At first, the sensor circuit controls the capacitive touch panel to sense a control object within different sensing ranges at different time points to determine a distance-related value between the control object and the capacitive touch panel. Then, the sensor circuit controls the capacitive touch panel to detect a floating touch action of the control object based on the distance-related value. Subsequently, the sensor circuit issues a control signal corresponding to the floating touch action to enable the touch device or the capacitive touch panel to perform a specific function.

13 Claims, 9 Drawing Sheets

(56) References Cited

U.S. PATENT DOCUMENTS

| | | | | |
|---|---|---|---|---|
| 8,330,474 B2* | 12/2012 | Vandermeijden | ..... | G06F 3/0416 324/658 |
| 8,415,960 B2* | 4/2013 | Hazelden | ............... | B60K 35/00 324/635 |
| 8,436,818 B2* | 5/2013 | Park | ...................... | G06F 3/0416 178/18.06 |
| 8,483,768 B2* | 7/2013 | Kim | ........................ | G06F 3/041 455/566 |
| 8,576,181 B2* | 11/2013 | Cho | ........................ | G06F 3/044 345/173 |
| 8,717,329 B2* | 5/2014 | Kitamura | ................ | G06F 3/044 178/18.06 |
| 8,723,825 B2* | 5/2014 | Wright | .................. | G06F 3/0416 345/156 |
| 8,860,683 B2* | 10/2014 | Baumbach | ........... | G06F 3/03547 345/174 |
| 9,052,790 B2* | 6/2015 | Yairi | ................... | G06F 3/04895 |
| 9,542,046 B2* | 1/2017 | Brunet | .................... | G06F 3/044 |
| 10,126,883 B2* | 11/2018 | Coulson | .................. | G06F 3/044 |
| 2006/0097991 A1* | 5/2006 | Hotelling | ............. | G06F 3/0416 345/173 |
| 2007/0229468 A1* | 10/2007 | Peng | ....................... | G06F 3/044 345/173 |
| 2007/0229469 A1* | 10/2007 | Seguine | .................. | G06F 3/011 345/173 |
| 2008/0122798 A1 | 5/2008 | Koshiyama et al. | | |
| 2008/0246723 A1 | 10/2008 | Baumbach | | |
| 2008/0297174 A1 | 12/2008 | Narasimhan et al. | | |
| 2009/0247233 A1 | 10/2009 | Kim | | |
| 2009/0289914 A1 | 11/2009 | Cho | | |
| 2009/0309851 A1* | 12/2009 | Bernstein | ............. | G06F 3/0416 345/174 |
| 2010/0020043 A1 | 1/2010 | Park et al. | | |
| 2010/0026660 A1* | 2/2010 | Kitamura | ................ | G06F 3/044 345/174 |
| 2010/0090712 A1 | 4/2010 | Vandermeijden | | |
| 2010/0182018 A1 | 7/2010 | Hazelden | | |
| 2010/0295559 A1 | 11/2010 | Osoinach et al. | | |
| 2011/0267310 A1 | 11/2011 | Tsukahara et al. | | |
| 2011/0279364 A1* | 11/2011 | Koshiyama | ........... | G06F 3/0412 345/156 |
| 2012/0154324 A1* | 6/2012 | Wright | .................. | G06F 3/0416 345/174 |
| 2014/0009428 A1 | 1/2014 | Coulson et al. | | |
| 2014/0035865 A1 | 2/2014 | Hu | | |
| 2014/0160064 A1 | 6/2014 | Yairi et al. | | |
| 2014/0267137 A1 | 9/2014 | Solven et al. | | |
| 2015/0002441 A1* | 1/2015 | Brunet | .................... | G06F 3/044 345/174 |

* cited by examiner

FLOATING TOUCH METHOD AND TOUCH DEVICE

CROSS-REFERENCE TO RELATED APPLICATIONS

The present application is a continuation-in-part application claiming benefit from a parent U.S. patent application bearing a Ser. No. 14/492,645 and filed Sep. 22, 2014, claiming benefit from a prior-filed provisional application bearing a Ser. No. 61/881,049 and filed Sep. 23, 2013, the entity of which are incorporated herein for reference.

FIELD OF THE INVENTION

The present disclosure relates to a touch sensing method for a touch device, and particularly to a floating touch method and a touch device operated with the floating touch method.

BACKGROUND OF THE INVENTION

With rapid development of touch sensing technology, many electronic apparatuses such as mobile phones, notebook computers or tablet computers take advantage of touch devices to provide intuitive operation and easy human-machine interface. These electronic apparatuses hugely enter modern lives and great business opportunities are created. There are two known touch sensing technologies, i.e. capacitive sensing and resistive sensing.

For capacitive sensing, when the touch device is touched with a human finger or a conductive object, a capacitor is temporarily formed on the electrode corresponding to the touched position. Therefore, equivalent capacitance of the corresponding electrode changes. A sensor circuit can determine the touched position on the touch device according to the equivalent capacitance change of the corresponding electrode.

For resistive sensing, when an object such a human finger or a stylus presses down onto a surface of the touch device, the upper electrode and the lower electrode are electrically connected at the pressed position so that the electrodes behave as a voltage divider circuit. Therefore, the sensor circuit can determine the pressed position on the touch device according to the voltage change of the upper electrode and the lower electrode.

Since large-area flat-panel display gains popularity now and touch sensing technology is widely used as the most friendly human-machine interface, there is an increased demand for large-area touch screen these days. For a large-area flat-panel display, optimum viewing distance increases. It does not make sense to control the display by actually touch a surface of the display with a finger or a conductive object instead of remote control. Therefore, a novel touch sensing method and touch device are desired.

SUMMARY OF THE INVENTION

An aspect of the present disclosure provides a floating touch method used with a capacitive touch panel. The capacitive touch panel includes separate electrode units and connecting traces corresponding to the separate electrode units one-on-one, wherein each of the separate electrode unit is electrically connected to one and only one of the connecting traces corresponding thereto. At first, the capacitive touch panel is controlled to sense a control object within different sensing ranges at different time points to determine a distance-related value between the control object and the capacitive touch panel. The distance-related value is determined by steps of: dividing the electrode units into first electrode unit groups wherein each of the first electrode unit groups has a first number of the electrode units, detecting the first electrode unit groups individually, and determining whether the control object is located within a first sensing range corresponding to the first electrode unit groups; dividing the electrode units into second electrode unit groups wherein each of the second electrode unit groups has a second number of the electrode units, detecting the second electrode unit groups individually, and determining whether the control object is located within a second sensing range corresponding to the second electrode unit groups, the second sensing range being greater than the first sensing range when the second number is greater than the first number; and determining the distance-related value to be corresponding to the first sensing range if the control object is determined to be located within both the first sensing range and the second sensing range. Then, the capacitive touch panel is controlled to detect a floating touch action of the control object based on the distance-related value. Subsequently, a control signal corresponding to the floating touch action is issued. When the control object moves, the floating touch method further includes steps of: deducing a first virtual projected region of the control object at a first position according a strength distribution of a sensing signal on the electrode units; scaling-up the first virtual projected region to obtain a second virtual projected region when the control object is located at a second position wherein the first position is closer to the capacitive touch panel than the second position; and determining third electrode unit groups corresponding to the second virtual projected region for detecting the floating touch action of the control object at the second position.

In an embodiment, when the control object is determined to be located within the first sensing range, the distance-related value corresponds to a boundary of the first sensing range.

In an embodiment, an operation menu and a cursor are shown in response to the floating touch action of the control object. The floating touch action of the control object may be a hover action and the distance-related value determined during the hover action is recorded as a distance reference.

In an embodiment, the control signal is issued to make an icon of the operation menu deform when the cursor is controlled to stay on the icon and the control object moves toward the capacitive touch panel. If the determined distance-related value of the control object is smaller than a specific value or a specific proportion of the distance reference, a function corresponding to the icon is performed.

In an embodiment, each of the third electrode unit groups further includes at least one partial electrode unit arranged at an edge of the capacitive touch panel, between two separate electrode units or between two other partial electrode units.

Another aspect of the present disclosure provides a touch device operated with a floating touch method. The touch device includes a capacitive touch panel and a sensor circuit electrically connected to the capacitive touch panel. The capacitive touch panel includes separate electrode units and connecting traces corresponding to the separate electrode units one-on-one, wherein each of the separate electrode units is electrically connected to one and only one of the connecting traces corresponding thereto. The sensor circuit controls the capacitive touch panel to sense a control object within different sensing ranges at different time points to determine a distance-related value between the control object and the capacitive touch panel, controls the capacitive touch panel to detect a floating touch action of the control object based on the distance-related value, and issues a control signal corresponding to the floating touch action. To sense the control object, the sensor circuit divides the electrode units into first electrode unit groups which are detected individually to determine whether the control object is located within a first sensing range corresponding to the first electrode unit groups; and divides the electrode units into second electrode unit groups which are detected individually to determine whether the control object is located within a second sensing range corresponding to the second electrode unit groups. Each of the first electrode unit groups has a first number of the electrode units while each of the second electrode unit groups has a second number of the electrode units, and the second sensing range is greater than the first sensing range when the second number is greater than the first number. The distance-related value corresponds to the first sensing range if the control object is determined to be located within both the first sensing range and the second sensing range.

In an embodiment, the capacitive touch panel includes partial electrode units smaller than the separate electrode units and disposed around edges of at least one of the separate electrode units. For example, the partial electrode units are arranged at edges of the capacitive touch panel, between the separate electrode units or between other partial electrode units.

In an embodiment, the sensor circuit shows an operation menu and a cursor on a display device.

In an embodiment, the floating touch action of the control object is a hover action and the distance-related value determined during the hover action is recorded as a distance reference.

In an embodiment, the sensor circuit issues the control signal to make an icon of the operation menu deform when the cursor is controlled to stay on the icon and the control object moves toward the capacitive touch panel, and the sensor circuit enables the touch device to perform a function corresponding to the icon if the determined distance-related value of the control object is smaller than a specific value or a specific proportion of the distance reference.

Another aspect of the present disclosure provides a floating touch device. The floating touch device includes a capacitive touch panel and a sensor circuit electrically connected to the capacitive touch panel. The capacitive touch panel includes separate electrode units and connecting traces corresponding to the separate electrode units, wherein each of the separate electrode units is electrically connected to one and only one of the connecting traces corresponding thereto. The separate electrode units and connecting traces are formed on a single surface. The capacitive touch panel has a first operation region and a second operation region. The sensor circuit controls the capacitive touch panel through the connecting traces to detect a first floating touch action within a first sensing range relative to the first operation region and issues a first control signal in response to the first floating touch action. The sensor circuit controls the capacitive touch panel through the connecting traces to detect a second floating touch action within a second sensing range relative to the second operation region and issues a second control signal in response to the second floating touch action. The first sensing range is greater than the second sensing range.

In an embodiment, the sensor circuit controls the capacitive touch panel to sense a control object within different sensing ranges at different time points to determine a distance-related value between the control object and the capacitive touch panel, and controls the sensor circuit to detect the first floating touch action of the control object based on the distance-related value to issue the first control signal. To sense the control object, the sensor circuit divides the electrode units into first electrode unit groups which are detected individually to determine whether the control object is located within a third sensing range corresponding to the first electrode unit groups; and divides the electrode units into second electrode unit groups which are detected individually to determine whether the control object is located within a fourth sensing range corresponding to the second electrode unit groups. The distance-related value is determined to be corresponding to a smaller one of the third sensing range and the fourth sensing range if the control object is determined to be located within both the third sensing range and the fourth sensing range.

In an embodiment, each of the first electrode unit groups has a first number of the electrode units, and each of the second electrode unit groups has a second number of the electrode units. The fourth sensing range is greater than the third sensing range when the second number is greater than the first number.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
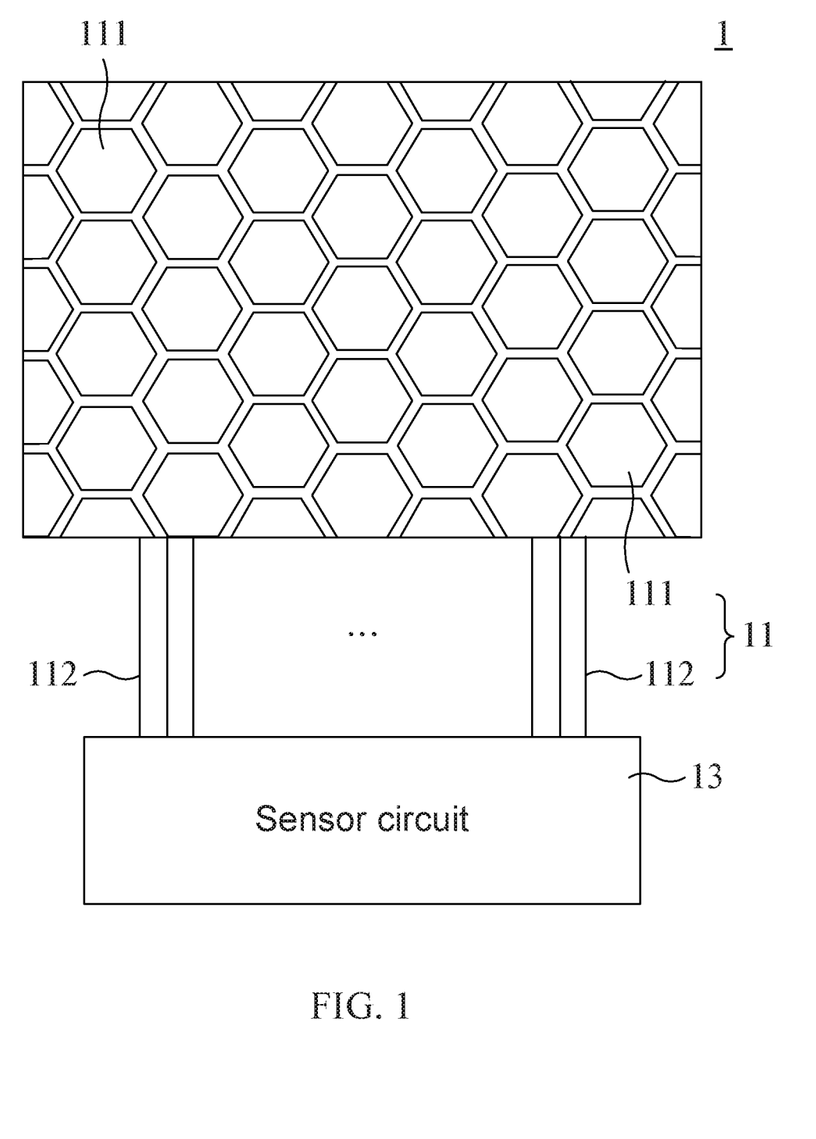
FIG. 1 is a schematic diagram illustrating a touch device according to an embodiment of the present invention.

Please refer to FIG. 1, a schematic diagram illustrating a touch device according to an embodiment of the present invention. The touch device 1 includes a capacitive touch panel 11 and a sensor circuit 13. The capacitive touch panel 11 includes separate electrode units 111 and connecting traces 112 corresponding to the separate electrode units 111 one-on-one. In other words, each of the connecting traces 112 is electrically connected to one and only one corresponding electrode unit 111. In this embodiment, the electrode units 11 are (regular) hexagonal electrode units 11 but are not limited to this shape. The connecting traces 112 are electrically connected to respective electrode units 111, and the sensor circuit 13 is electrically connected to the connecting traces 112 so as to control the capacitive touch panel 11. The sensor circuit 13 controls the capacitive touch panel 11 to determine a distance-related value between a control object (e.g. a human finger, palm or conductive member) and the capacitive touch panel 11. The term "distance-related value" may be any parameter that reflects a relative distance between the control object and the capacitive touch panel 11. The sensor circuit 13 controls the capacitive touch panel 11 to detect a floating touch action of the control object based on the distance-related value, and issues a control signal to enable the touch device 1 or the capacitive touch panel 11 to perform a specific function in response to the floating touch action of the control object.

Figure 2A:
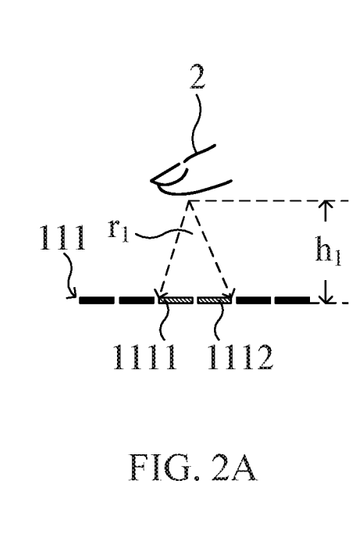
FIGS. 2A-2C are schematic diagrams illustrating relations between sensing ranges and grouping electrode units.
Figure 2B:
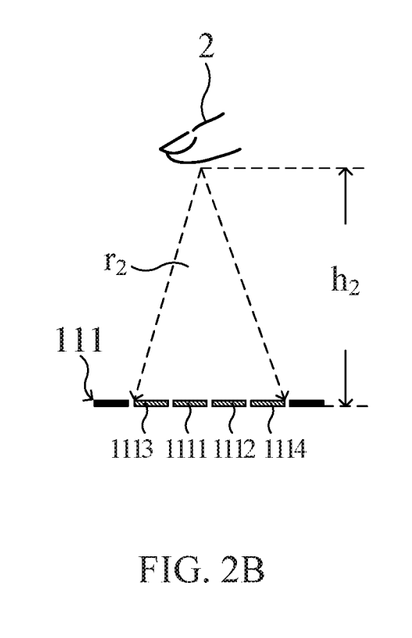
Figure 2C:
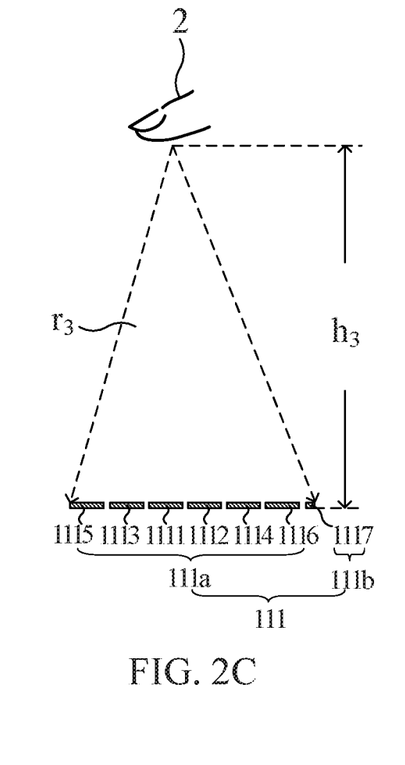

Please refer to FIGS. 2A-2C, schematic diagrams illustrating relations between sensing ranges and grouping electrode units. As shown in FIG. 2A, when the sensor circuit 13 simultaneously measures capacitances (or capacitance changes) of two electrode units 1111 and 1112, namely an electrode unit group, the control object 2 such as a finger located within the sensing range $r_1$ can be sensed according to floating touch technology. For many electrode unit groups each of which includes two electrode units 111, a combined sensing range with a "thickness" $h_1$ forms in front of the capacitive touch panel 11. In other words, if the control object 2 is located at a distance no more than a distance threshold $h_1$, the control object 2 can be sensed by the capacitive touch panel 11 when every two electrode units 111 are grouped to perform the sensing function. As shown in FIG. 2B, when the capacitances (or capacitance changes) of the electrode unit group including four electrode units 1111, 1112, 1113 and 1114 are measured, the control object 2 located within the sensing range $r_2$ which is greater than the sensing range $r_1$ can be sensed. Under this condition, a combined sensing range with a distance threshold $h_2$ is obtained. As shown in FIG. 2C, when the sensor circuits 13 simultaneously detects seven electrode units 1111, 1112, 1113, 1114, 1115, 1116 and 1117 which means that an electrode unit group includes seven electrode units, a further greater sensing range $r_3$ is achieved. Under this condition, the distance threshold is $h_3$.

Referring to FIGS. 2A-2C, the sensing range for floating touch can be adjusted by changing the number of the electrode units 111 in one electrode unit group, i.e. the number of the electrode units 111 simultaneously detected by the sensor circuit 13. In other words, the greater distance between the control object 2 and the capacitive touch panel 11 is, the larger virtual projected region covering the electrode units 111 is. The electrode units 111 included in the projected region are required for sensing the control object 2 at the specific distance. Thus, more electrode units 111 included in a greater projected region correspond to a greater sensing range. Therefore, an effective area of the electrode units 111 included in the projected region results in an increased sensible distance between the control object 2 and the capacitive touch panel 11, and the effective area may be viewed as a parameter of sensing strength. It is possible to fine-tune or balance the effective area of the electrode units 111 included in an electrode unit group (projected region). As shown in FIG. 2C, the electrode units 1111, 1112, 1113, 1114, 1115, 1116 are full electrode units 111a, and the electrode unit 1117 is a partial electrode unit 111b with a smaller electrode area. The partial electrode units 111b may be arranged at specific regions of the capacitive touch panel 11, for example, around edges of the full electrode units 111a to adjust, balance or fine-tune the effective areas of the electrode unit groups. The quantities and the positions of the partial electrode units 111b and the full electrode units 111a are not limited to this example and may be modified in different embodiments to meet various requirements. It is to be noted that the partial electrode units are electrically connected to corresponding connecting trace one-on-one.

Figure 3:
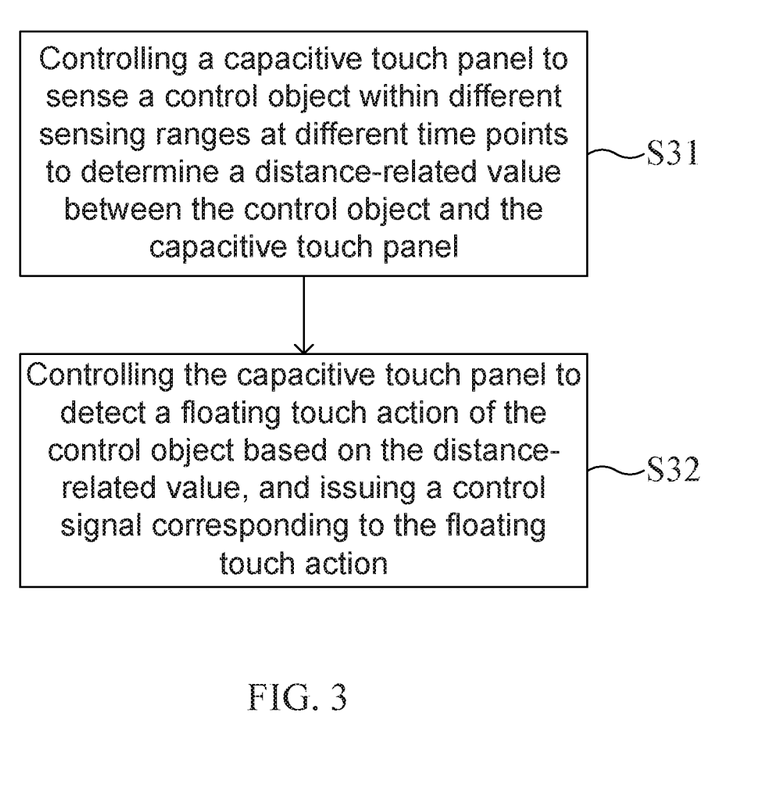
FIG. 3 is a flowchart illustrating a floating touch method according to an embodiment of the present invention.

Please refer to FIG. 3, a flowchart illustrating a floating touch method according to an embodiment of the present invention. The floating touch method is used with the touch device 1 including the capacitive touch panel 11 and the sensor circuit 13. At first, the sensor circuit 13 controls the capacitive touch panel 11 to sense a control object 2 within different sensing ranges at different time points to determine a distance-related value between the control object 2 and the capacitive touch panel 11 (step S31). Then, the sensor circuit 13 controls the capacitive touch panel 11 to detect a floating touch action of the control object 2 based on the distance-related value, and issues a control signal to enable the touch device 1 or the capacitive touch panel 11 to perform a specific function in response to the floating touch action of the control object 2 (step S32). The distance-related value between the control object 2 and the capacitive touch panel 11 may be determined through different ways which are described in detail later.

Figure 4:
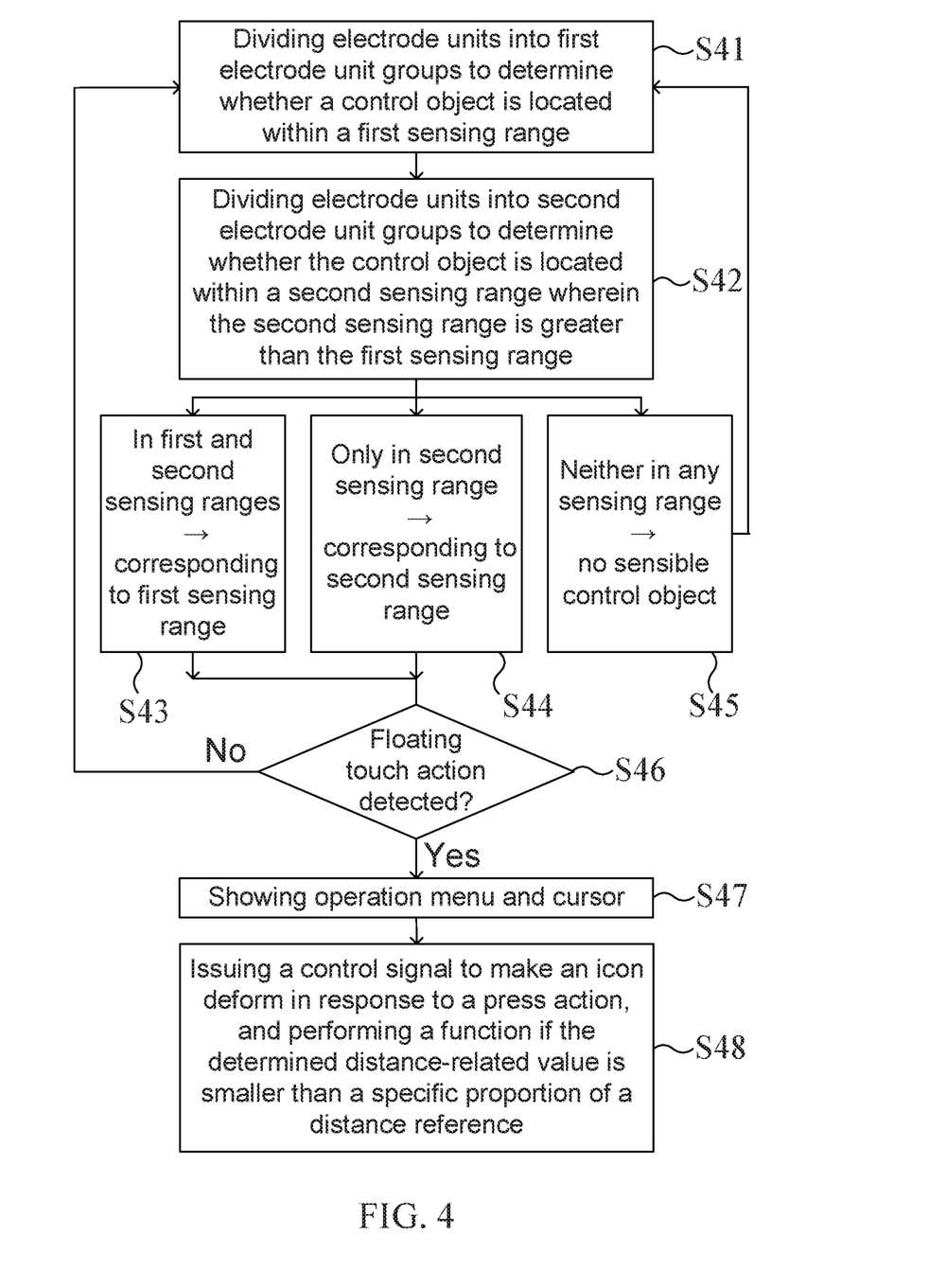
FIG. 4 is a flowchart illustrating a floating touch method according to another embodiment of the present invention.

Please refer to FIG. 4, a flowchart illustrating a floating touch method according to another embodiment of the present invention. At first, the sensor circuit 13 divides the electrode units 111 into first electrode unit groups and detects the first electrode unit groups individually, and determines whether the control object 2 is located within a first sensing range corresponding to the first electrode unit groups (step S41). Each of the first electrode unit groups includes a first number of the electrode units 111. The sensor circuit 13 detects the electrode units 111 (i.e. measuring capacitances or capacitance changes of the electrode units 111) of the same first electrode unit group simultaneously in response to a first driving signal from the sensor circuit 13. After detecting all of the first electrode unit groups, the sensor circuit 13 can determine whether the control object 2 is located within the first sensing range according to the capacitance changes.

Then, the sensor circuit 13 divides the electrode units 111 into second electrode unit groups and detects the second electrode unit groups individually, and determines whether the control object 2 is located within a second sensing range corresponding to the second electrode unit groups (step S42). Each of the second electrode unit groups includes a second number of the electrode units 111, while the second number is greater than the first number. For example, one of the first electrode unit groups includes two electrode units 1111 and 1112 (FIG. 2A) and one of the second electrode unit groups includes four electrode units 1111, 1112, 1113 and 1114 (FIG. 2B). The second sensing range $r_2$ is greater than the first sensing range $r_1$. In a similar manner, the sensor circuit 13 detects the electrode units 111 (i.e. measuring capacitances or capacitance changes of the electrode units 111) of the same second electrode unit group simultaneously in response to a second driving signal from the sensor circuit 13. After detecting all of the second electrode unit groups, the sensor circuit 13 can determine whether the control object 2 is located within the second sensing range according to the capacitance changes. In this embodiment, the sensor circuit 13 controls the capacitive touch panel 11 to scan from a smaller sensing range to a larger sensing range, i.e. in a direction away from the touch device 1 like an outward scanning.

According to the determination in steps S41 and S42, the distance-related value between the control object 2 and the capacitive touch panel 11 is determined according to the following steps. If the control object 2 is determined to be located within both the first sensing range and the second sensing range, the distance-related value corresponds to the first sensing range or a boundary of the first sensing range (step S43). If the control object 2 is determined to be located within the second sensing range but not located within the first sensing range, the distance-related value corresponds to the second sensing range or a boundary of the second sensing range (step S44). If the control object 2 is determined to be not located within any of the first sensing range and the second sensing range (step S45), there is no sensible control object, and the method returns to step S41 to start another dividing and determining step.

Please be noted that the number of the sensing ranges may be adjusted according to the total quantity of the electrode units 111, dimension of the capacitive touch panel 11 or other factors. Therefore, the electrode units 111 are grouped in different sizes at different time points. On condition that the control object 2 is determined to be located within multiple sensing ranges, the distance-related value corresponds to the smallest sensing range among the multiple sensing ranges or the boundary of the smallest sensing range.

The steps for determining the distance-related value are not limited to the examples as described above. For example, once the control object 2 is found to be located in a specific sensing range, it is not necessary for the sensor circuit 13 to control the capacitive touch panel 11 to scan farther. Therefore, the step for determining the distance-related value may be modified as follows. At first, the sensor circuit 13 divides the electrode units 111 into electrode unit groups and detects the electrode unit groups individually, and determines whether the control object 2 is located within a sensing range corresponding to the electrode unit groups. If the control object 2 is determined to be located within the sensing range, the distance-related value of the control object 2 corresponds to the sensing range (or boundary). If the control object 2 is determined to be not located within the sensing range, the sensor circuit 13 repeats the previous steps wherein the next electrode unit groups include more electrode units than the previous electrode unit groups. In this embodiment, the sensor circuit 13 does not control the capacitive touch panel 11 to complete a full scanning in a direction away from the touch device 1 every time to determine the distance-related value.

Alternatively, the sensor circuit 13 may control the capacitive touch panel to complete a full scanning in a direction away from the touch device 1 every time to determine the distance-related value. This approach can avoid unpredictable disturbance during the scanning.

As described above, the sensor circuit 13 controls the capacitive touch panel 11 to sense the control object 2 within different sensing ranges at different time points. The whole procedure may be considered as a three dimensional scanning action (i.e. x-axis and y-axis representing orthogonal directions along the surface of the capacitive touch panel 11 and z-axis representing a direction perpendicular to the surface). In addition to the position of the control object 2, the sensor circuit 13 can obtain more information such as motion or contours of the control object 2 in front of the touch device 1.

Figure 5A:
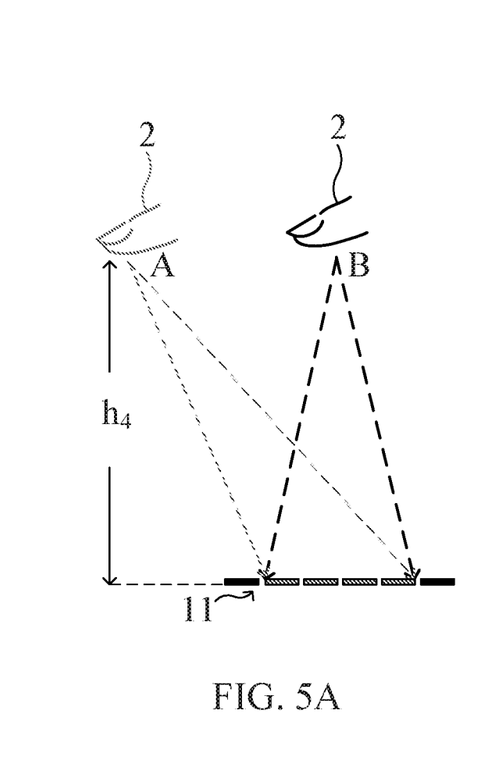
FIG. 5A is a schematic diagram illustrating a floating touch action.

After the sensor circuit 13 determines the distance-related value between the control object 2 and the capacitive touch panel 11, the sensor circuit 13 controls the capacitive touch panel 11 to detect whether the control object 2 performs a floating touch action based on the determined distance-related value (step S46). For example, the floating touch action is a hover action, i.e. moving along a direction substantially parallel to the xy plane of the capacitive touch panel 11. As shown in FIG. 5A, the control object 2 moves from a position A to a position B at a distance $h_4$ from the capacitive touch panel 11, and the hover action can be detected by the sensor circuit 13 through sensing different electrode unit groups corresponding to the positions A and B.

If no floating touch action is detected in step S46, the method returns to step S41. Otherwise, if the sensor circuit 13 detects a floating touch action based on the distance-related value, the distance $h_4$ (or the current distance-related value) is recorded as a distance reference. In addition, the sensor circuit 13 enables a display device (not shown) to show an operation menu and a cursor (step S47). The cursor moves or changes in response to subsequent movement of the control object 2.

Sometimes, the distance-related values determined during the hover action are not a constant value and slightly vary. Under this condition, the distance reference may be an average value of the determined distance-related values.

Figure 5B:
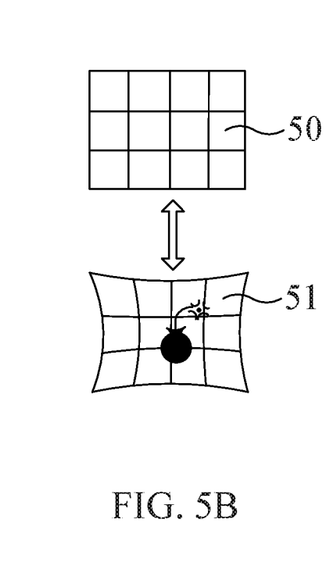
FIG. 5B is a schematic diagram illustrating an icon change in response to a press action.
Figure 5C:
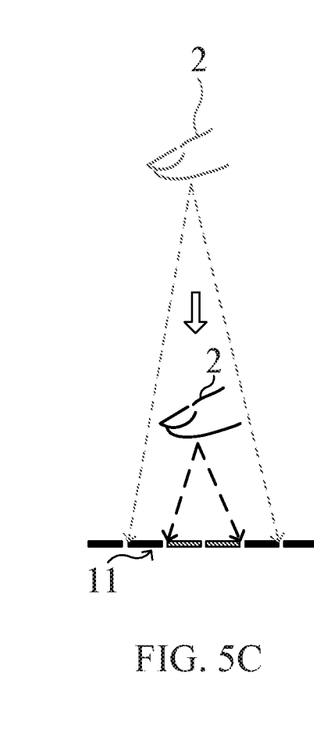
FIG. 5C is a schematic diagram illustrating another floating touch action.

When the control object 2 stops moving and makes the cursor stay on an option or an icon 50 (FIG. 5B) of the operation menu, the control object 2 may be controlled to move toward the capacitive touch panel 11 to simulate a press action. Under this condition, the determined distance-related value between the control object 2 and the capacitive touch panel 11 becomes smaller and smaller (FIG. 5C). The press action can be detected by the sensor circuit 13 because smaller and smaller distance-related values are obtained during the press action. When the sensor circuit 13 finds the phenomenon during continuous scanning along the z-axis with respect to the capacitive touch panel 11, it is determined that a press action occurs. In response to the press action, the sensor circuit 13 issues a control signal to make the icon 50 deform. For example, the icon 51 curves inward continuously as shown in FIG. 5B, but it is not limited to such effect. During the press action, after the determined distance-related value is smaller than a specific value or a specific proportion (e.g. 50%) of the distance reference $h_4$, animation effects to the icon 51, e.g. rupture may be provided. Then, the touch device 1 performs a specific function represented by the icon 50 (step S48).

Figure 6:
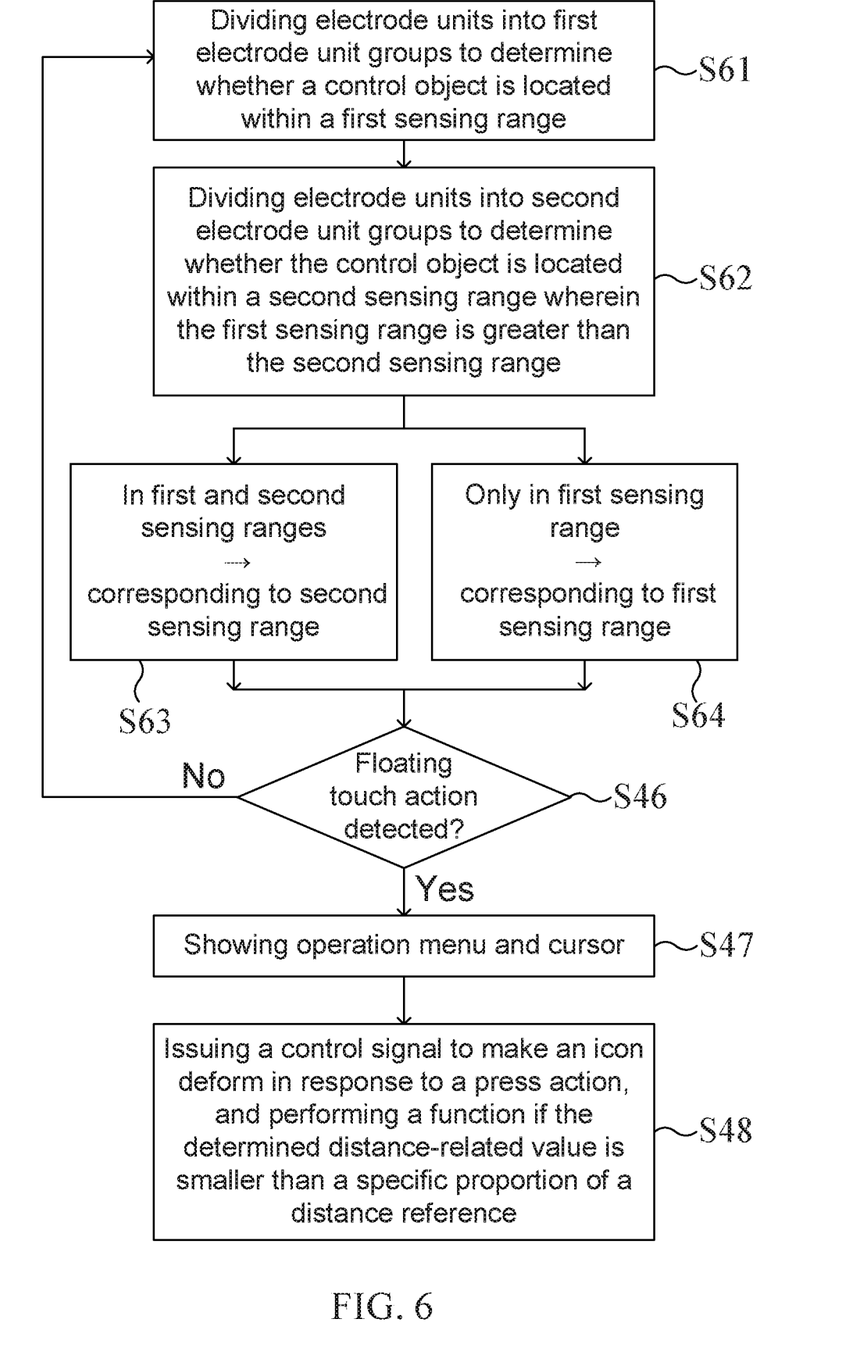
FIG. 6 is a flowchart illustrating a floating touch method according to a further embodiment of the present invention.

Please refer to FIG. 6, a flowchart illustrating a floating touch method according to a further embodiment of the present invention. Compared to the floating touch method with reference to FIG. 4, the floating touch method in this embodiment performs an inward scanning. At first, the sensor circuit 13 divides the electrode units 111 into first electrode unit groups and detects the first electrode unit groups individually, and determines whether the control object 2 is located within a first sensing range corresponding to the first electrode unit groups (step S61). Each of the first electrode unit groups includes a first number of the electrode units 111. The sensor circuit 13 detects the electrode units 111 (i.e. measuring capacitances or capacitance changes of the electrode units 111) of the same first electrode unit group simultaneously in response to a first driving signal from the sensor circuit 13. After detecting all of the first electrode unit groups, the sensor circuit 13 can determine whether the control object 2 is located within the first sensing range according to the capacitance changes.

Then, the sensor circuit 13 divides the electrode units 111 into second electrode unit groups and detects the second electrode unit groups individually, and determines whether the control object 2 is located within a second sensing range corresponding to the second electrode unit groups (step S62). Each of the second electrode unit groups includes a second number of the electrode units 111, while the first number is greater than the second number. For example, one of the first electrode unit groups includes four electrode units 1111, 1112, 1113 and 1114 (FIG. 2B) and one of the second electrode unit groups includes two electrode units 1111 and 1112 (FIG. 2A). The first sensing range $r_1$ is greater than the second sensing range $r_2$. In a similar manner, the sensor circuit 13 detects the electrode units 111 (i.e. measuring capacitances or capacitance changes of the electrode units 111) of the same second electrode unit group simultaneously in response to a second driving signal from the sensor circuit 13. After detecting all of the second electrode unit groups, the sensor circuit 13 can determine whether the control object 2 is located within the second sensing range according to the capacitance changes. In this embodiment, the sensor circuit 13 controls the capacitive touch panel 11 to scan from a larger sensing range to a smaller sensing range, i.e. in a direction toward the touch device 1 like an inward scanning.

According to the determination in steps S61 and S62, the distance-related value between the control object 2 and the capacitive touch panel 11 is determined according to the following steps. If the control object 2 is determined to be located within both the first sensing range and the second sensing range, the distance-related value corresponds to the second sensing range (or boundary) (step S63). If the control object 2 is determined to be located within the first sensing range but not located within the second sensing range, the distance-related value corresponds to the first sensing range (or boundary) (step S64). Furthermore, the sensor circuit 13 may control the capacitive touch panel 11 to finish a full inward scanning to accurately determine the distance-related value.

Please be noted that the number of the sensing ranges may be adjusted according to the total quantity of the electrode units 111, dimension of the capacitive touch panel 11 or other factors. Therefore, the electrode units 111 are grouped in different sizes at different time points. On condition that the control object 2 is determined to be located within multiple sensing ranges, the distance-related value corresponds to the smallest sensing range among the multiple sensing ranges or the boundary of the smallest sensing range.

After the sensor circuit 13 determines the distance-related value between the control object 2 and the capacitive touch panel 11, steps S46-S48 are performed as described in the previous embodiment with reference to FIG. 4, and the redundant detail is not repeated here.

In conclusion, the floating touch method and the touch device operated with this method allow the capacitive touch panel 11 to sense a control object 2 within different sensing ranges at different time points. The major step is to divide the electrode units 111 into electrode unit groups to enlarge the sensible distance. The electrode units 111 in the same group are detected simultaneously in response to a driving signal. The driving signal may be sent to the electrode unit groups individually or simultaneously. Changing grouping size of the electrode units can adjust the sensing range to obtain a distance-related value. The sensor circuit 13 issues a control signal in response to a floating touch action of the control object 2 which is detected based on the distance-related value. The touch device 1 or the capacitive touch panel 11 performs the specific function in response to the control signal. Although the user may use the control object 2, i.e. his finger at different positions or different distances in front of the touch device 1, the distance-related values are obtained in real time to adapt the floating touch method for the user habit. It is not necessary for the user to stand at a fixed position to remotely control the touch device 1, so convenience and flexibility of the touch sensing operation is greatly improved.

Further, the floating touch method and the touch device can be applied to an input device or other floating touch device, e.g. a keyboard device or a virtual keyboard. Please refer to FIG. 7, a schematic diagram illustrating a portion of a keyboard device operated with the floating touch method according to the present disclosure. The keyboard device 7 includes a capacitive touch panel 11 and a sensor circuit (not shown), which are similar to the elements as described in the previous embodiments and the redundant detail is not repeated here. An elastic cover 72 is disposed on the capacitive touch panel 11. For example, the elastic cover 72 includes many arched or convex resilient member made of flexible or rubber material. Each convex resilient member may correspond to one key of the keyboard device 7. No electronic circuit is required to be connected to the elastic cover 72 because the elastic cover 72 mainly provides "touch and press feeling" assisting the user in accurate typing to reduce discomforts due to unfamiliar floating touch manner. The elastic cover 72 may be or may be not in contact with the capacitance touch panel 11. Before the user presses the elastic cover 72 with any control object such as a finger or palm, a distance h between a touch area 721 of the convex resilient member and the capacitive touch panel 11 may be considered as a distance reference as described above, but the distance reference is not limited to this definition.

Figure 7:
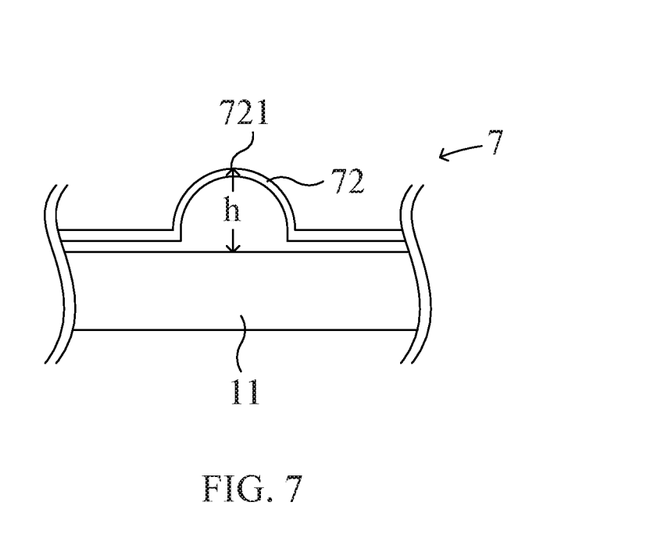
FIG. 7 is a schematic diagram illustrating a portion of a keyboard device operated with the floating touch method according to the present disclosure.

When the user touches and presses the touch area 721 of a convex resilient member corresponding to a specific key, the sensor circuit can detect the press action by continuous scanning which includes the step of sensing the control object within different sensing ranges at different time points to determine distance-related values between the user finger and the capacitive touch panel 11. If the sensor circuit finds that the distance-related values are getting smaller and smaller, a press action may occur and the convex resilient member curves inward. After the distance-related value is smaller than a specific value or a specific proportion of the distance reference, e.g. 50%, the sensor circuit issues a keystroke signal (control signal) corresponding to the specific key of the keyboard device 7. After the pressure is removed from the touch area 721, the convex resilient member restores to its original shape. The elastic cover 72 may be fixed in the keyboard device 7, or be detachably coupled to the capacitive touch panel 11, especially for a virtual keyboard which is hidden for some cases. Alternatively, no elastic cover 72 is provided, and the user operates the keyboard device 7 in a floating manner.

In an embodiment, different distance references may be set for different regions on the touch device. For example, a display region and a keyboard region may have different distance references so as to adjust touch sensitivities for different regions. For another example, since the user may virtual-press the touch device with a non-constant pressure, e.g. greater pressure at the central region and weaker pressure at the sides, the sensing ranges and distance references may be adjusted at different regions to fit individual habit. Therefore, the present disclosure provides a more convenient and user friendly floating touch method and device.

Figure 8:
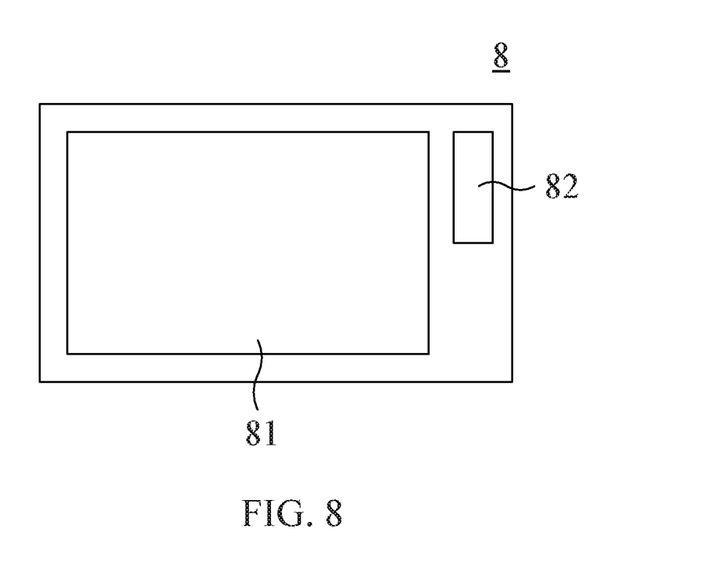
FIGS. 8-10 are schematic diagrams illustrating applications of the touch device according to the present disclosure.

Please refer to FIG. 8, a schematic diagram illustrating another application of the touch device. The electrode units and the connecting traces of the touch device are arranged on a single surface, e.g. a plane surface of a substrate. In a further embodiment, the electrode units and the connecting traces are formed as a single layer, and the electrode units and the connecting traces are electrically connected to each other one-on-one. The electrode units are separate hexagonal electrode units, as shown in FIG. 1, and partial electrode units (FIG. 2C) may be adopted to increase the application flexibility. In an embodiment, two operation regions 81 and 82 are provided on a large display 8. The operation region 81 detects floating touch actions within a greater sensing range, e.g. hand moving for channel change, and the operation region 82 detects floating touch actions within a smaller sensing range, e.g. finger touch or moving for option selection or instruction input. The shape of the regions can be defined or changed arbitrarily due to the single layer arrangement of the electrode units and the connecting traces and the one-on-one connection. In other words, the electrode units may be individually controlled, but not controlled by row driving signals and column driving signals for two-dimension sensor array. The conventional touch device having electrode units in two-dimensional arrangement has much limitation due to its complicated cross-over structure.

Figure 9:
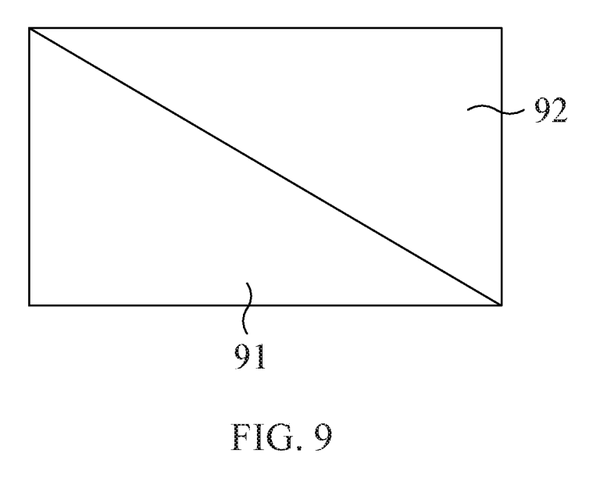
Figure 10:
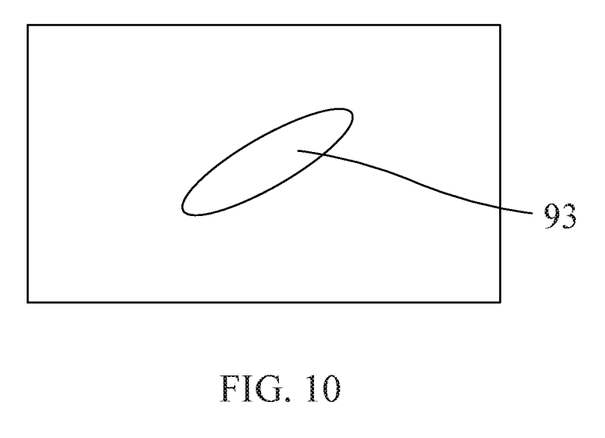

FIG. 9 and FIG. 10 illustrate different applications of the present disclosure. In FIG. 9, the touch area is divided by a diagonal line to provide two right triangular operation regions 91 and 92. In FIG. 10, the operation region 93 has a shape of a narrow ellipse extending along the diagonal direction. It is to be noted that the shapes of the operation regions are not limited to these embodiments. The electrode units in the operation regions 91-93 may be grouped in any desired shapes to achieve specific floating touch control. Since the electrode units may be individually controlled, the sensor circuit can easily provide the operation regions and the electrode unit groups by selecting or controlling proper electrode units, instead of a column/row of the electrode units. Thus, such design enhances the operation flexibility of the touch device. The detailed description of one-dimensional sensor array is given in US 2014/0035865 and incorporated herein for reference.

Figure 11:
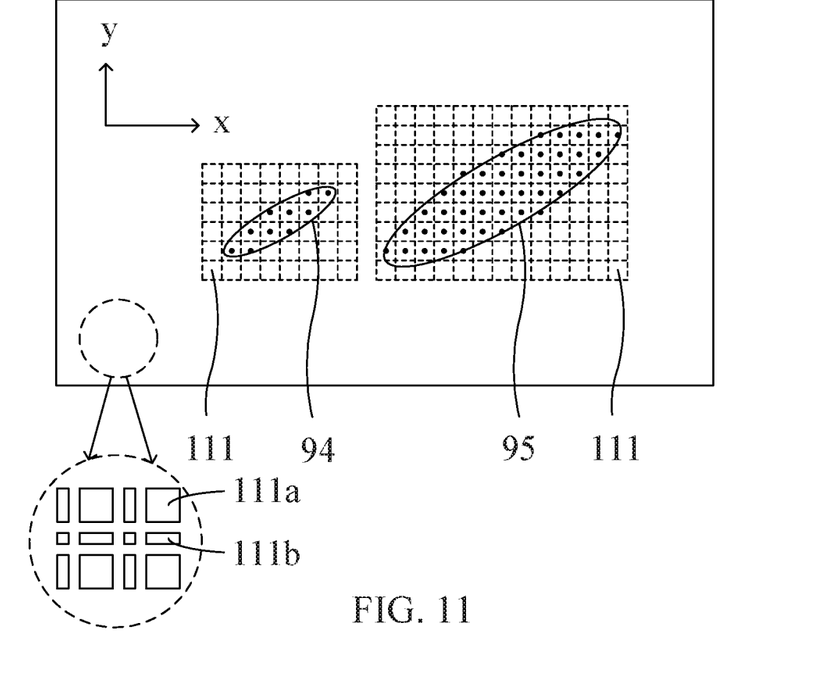
FIG. 11 is a schematic diagram illustrating an embodiment of the electrode unit groups according to the present disclosure.

When the control object is located near the touch device, each electrode unit group for sensing the control object may have fewer electrode units corresponding small sensing range. After measuring a strength distribution of the sensing signal (representing capacitance changes) on the electrode units, the virtual projected region on the capacitive touch panel due to the control object (e.g. finger, hand or arm) can be deduced. The virtual projected region has a specific shape and covers several electrode units, and these electrode units may be grouped as an electrode unit group. Therefore, the electrode unit group has a specific shape corresponding to the control object. When the control object moves away from the touch device, a greater similar virtual projected region without rotation is required. Proportionally enlarged electrode unit group can be obtained by selecting the electrode units corresponding to the greater similar virtual projected region. Such floating touch method can increase the precision of the floating touch control. Take an example in FIG. 11, the control object is located near the touch device and a virtual projected region 94 is deduced according to the strength distribution of the sensing signal. The virtual projected region 94 has a shape of a narrow ellipse from upper right to lower left, and so does the smaller electrode unit group corresponding to the smaller sensing range. Thus, the electrode unit group includes the electrode units 111 with dots covered by the smaller virtual projected region 94. Then, the electrode units of the greater electrode unit group for the greater sensing range may correspond to a scale-up virtual projected region 95 having a similar shape, i.e. a narrow ellipse from upper right to lower left. For example, the greater electrode unit group includes the electrode units 111 with dots covered by the scale-up virtual projected region 95. In an embodiment, multiple greater electrode unit groups are arranged along the x-direction or the y-direction to focus on x-axis scanning or y-axis scanning, but the scanning direction is not limited to this embodiment. The effective area and shape of the electrode unit group may be adjusted, balanced or fine-tuned by introducing partial electrode units 111b. The partial electrode units 111b may be arranged at specific regions of the capacitive touch panel, for example, at edges of the capacitive touch panel, between two full electrode units 111a or between other partial electrode units 111b. The quantities and the positions of the partial electrode units 111b relative to the full electrode units 111a are not limited to this embodiment and may be modified to meet various requirements. Therefore, the present floating touch method and touch device have advantages over the conventional touch device having two-dimensional sensor array.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A floating touch method used with a capacitive touch panel comprising a plurality of separate electrode units and a plurality of connecting traces corresponding to the separate electrode units one-on-one, wherein each of the separate electrode unit is electrically connected to one and only one of the connecting traces corresponding thereto, the floating touch method comprising steps of:

controlling the capacitive touch panel to sense a control object within different sensing ranges at different time points to determine a distance-related value between the control object and the capacitive touch panel, the controlling step comprising:

dividing the electrode units into a plurality of first electrode unit groups wherein each of the first electrode unit groups has a first number of the electrode units, detecting the first electrode unit groups individually, and determining whether the control object is located within a first sensing range corresponding to the first electrode unit groups;

dividing the electrode units into a plurality of second electrode unit groups wherein each of the second electrode unit groups has a second number of the electrode units, detecting the second electrode unit groups individually, and determining whether the control object is located within a second sensing range corresponding to the second electrode unit groups, the second sensing range being greater than the first sensing range when the second number is greater than the first number; and determining the distance-related value using the first sensing range and the second sensing range, wherein the distance-related value corresponds to the first sensing range when the control object is determined to be located within both the first sensing range and the second sensing range and the distance-related value corresponds to the second sensing range when the control object is determined to be solely in the second sensing range;

controlling the capacitive touch panel to detect a floating touch action of the control object based on the distance-related value; and issuing a control signal corresponding to the floating touch action, the floating touch method further comprising steps of:

deducing, on the capacitive touch panel, a first virtual projected region of the control object at a first position according to a strength distribution of a sensing signal on the electrode units, the first virtual projected region having a specific shape substantially conformal to a projected shape of the control object;

scaling-up the first virtual projected region to obtain a second virtual projected region when the control object is located at a second position wherein the first position is closer to the capacitive touch panel than the second position; and providing a plurality of third electrode unit groups, each of which has the specific shape and has a size corresponding to the second virtual projected region for detecting the floating touch action of the control object at the second position.

2. The floating touch method according to claim 1, wherein when the control object is determined to be located within the first sensing range, the distance-related value corresponds to a boundary of the first sensing range.

3. The floating touch method according to claim 1, further comprising a step of showing an operation menu and a cursor in response to the floating touch action of the control object.

4. The floating touch method according to claim 3, wherein the floating touch action of the control object is a hover action and the distance-related value determined during the hover action is recorded as a distance reference.

5. The floating touch method according to claim 4, further comprising a step of issuing the control signal to make an icon of the operation menu deform when the cursor is controlled to stay on the icon and the control object moves toward the capacitive touch panel.

6. The floating touch method according to claim 5, further comprising a step of performing a function corresponding to the icon when the determined distance-related value of the control object is smaller than a specific value or a specific proportion of the distance reference.

7. The floating touch method according to claim 1, wherein each of the third electrode unit groups further comprises at least one partial electrode unit arranged at an edge of the capacitive touch panel, between two separate electrode units or between two other partial electrode units.

8. A touch device comprising:

a capacitive touch panel comprising a plurality of separate electrode units and a plurality of connecting traces corresponding to the separate electrode units one-on-one, wherein each of the separate electrode units is electrically connected to one and only one of the connecting traces corresponding thereto; and a sensor circuit electrically connected to the connecting traces, configured to control the capacitive touch panel to sense a control object within different sensing ranges at different time points to determine a distance-related value between the control object and the capacitive touch panel, configured to control the capacitive touch panel to detect a floating touch action of the control object based on the distance-related value, and configured to issue a control signal corresponding to the floating touch action, wherein the sensor circuit:

divides the electrode units into a plurality of first electrode unit groups which are detected individually to determine whether the control object is located within a first sensing range corresponding to the first electrode unit groups;

divides the electrode units into a plurality of second electrode unit groups which are detected individually to determine whether the control object is located within a second sensing range corresponding to the second electrode unit groups, wherein each of the first electrode unit groups has a first number of the electrode units while each of the second electrode unit groups has a second number of the electrode units, the second sensing range being greater than the first sensing range when the second number is greater than the first number; and determines the distance-related value using the first sensing range and the second sensing range, wherein the distance-related value corresponds to the first sensing range when the control object is determined to be located within both the first sensing range and the second sensing range, and the distance-related value corresponds to the second sensing range when the control object is determined to be solely in the second sensing range, wherein the sensor circuit repetitively divides the electrode units into electrode unit groups with different sizes to perform an outward scanning or an inward scanning to determine the distance-related value by gradually increasing the sensing ranges or gradually decreasing the sensing ranges.

9. The touch device according to claim 8, wherein the capacitive touch panel comprises a plurality of partial electrode units smaller than the separate electrode units and disposed around edges of at least one of the separate electrode units.

10. The touch device according to claim 9, wherein the partial electrode units are arranged at edges of the capacitive touch panel, between the separate electrode units or between other partial electrode units.

11. The touch device according to claim 8, wherein the sensor circuit shows an operation menu and a cursor on a display device.

12. The touch device according to claim 11, wherein the floating touch action of the control object is a hover action and the distance-related value determined during the hover action is recorded as a distance reference.

13. The touch device according to claim 12, wherein the sensor circuit issues the control signal to make an icon of the operation menu deform when the cursor is controlled to stay on the icon and the control object moves toward the capacitive touch panel, and the sensor circuit enables the touch device to perform a function corresponding to the icon when the determined distance-related value of the control object is smaller than a specific value or a specific proportion of the distance reference.

* * * * *